(12) United States Patent
Kiriyama et al.

(10) Patent No.: US 7,737,071 B2
(45) Date of Patent: Jun. 15, 2010

(54) CATALYST FOR HYDROTREATING HYDROCARBON OIL, PROCESS FOR PRODUCING THE SAME, AND METHOD FOR HYDROTREATING HYDROCARBON OIL

(75) Inventors: Kazuyuki Kiriyama, Satte (JP); Takashi Fujikawa, Satte (JP); Masahiro Kato, Sapporo (JP); Minoru Hashimoto, Satte (JP)

(73) Assignee: Cosmo Oil Co., Ltd., Tokyo (JP)

( * ) Notice: Subject to any disclaimer, the term of this patent is extended or adjusted under 35 U.S.C. 154(b) by 448 days.

(21) Appl. No.: 10/594,451

(22) PCT Filed: Mar. 22, 2005

(86) PCT No.: PCT/JP2005/005099

§ 371 (c)(1),
(2), (4) Date: Jan. 9, 2007

(87) PCT Pub. No.: WO2005/092498

PCT Pub. Date: Oct. 6, 2005

(65) Prior Publication Data

US 2008/0017551 A1    Jan. 24, 2008

(30) Foreign Application Priority Data

Mar. 26, 2004  (JP) .............................. 2004-092795
Feb. 25, 2005  (JP) .............................. 2005-051761

(51) Int. Cl.
*B01J 27/19* (2006.01)
(52) U.S. Cl. .................. 502/170; 502/208; 502/209; 502/210; 502/211; 208/133; 208/134
(58) Field of Classification Search ......... 502/208–211; 208/133–134
See application file for complete search history.

(56) References Cited

U.S. PATENT DOCUMENTS

| 4,066,572 A * | 1/1978 | Choca .................. 502/210 |
| 4,727,209 A | 2/1988 | Chao |
| 7,361,624 B2 * | 4/2008 | Fujikawa et al. ........... 502/170 |
| 2003/0173256 A1 | 9/2003 | Fujikawa et al. |
| 2004/0186014 A1 | 9/2004 | Tsukada et al. |

FOREIGN PATENT DOCUMENTS

| EP | 0665280 A1 | 8/1995 |
| EP | 1029592 A1 | 8/2000 |
| EP | 1043069 A1 | 10/2000 |
| EP | 1402948 A1 | 3/2004 |
| EP | 1775019 A1 | 4/2007 |
| JP | 06-339635 A | 12/1994 |
| JP | 07-305077 A | 11/1995 |
| JP | 2000-135438 A | 5/2000 |
| JP | 2000-313890 A | 11/2000 |
| JP | 2003-503193 A | 1/2003 |
| JP | 2003-299960 A | 10/2003 |
| JP | 2005-262063 A | 9/2005 |
| WO | 03/006156 A1 | 1/2003 |
| WO | WO 03/000410 A1 * | 1/2003 |
| WO | WO 03/006156 A1 | 1/2003 |

OTHER PUBLICATIONS

Murray, K.L. et al (1999). Langmuir, 15, 8155-8160.*
Tsakiroglou, C.D. et al. (2004). Materials, Interfaces, and Electrochemical Phenomena, 50(2), 489-510.*
Japanese Office Action issued May 21, 2008.
Chinese Office Action issued May 9, 2008.
Japanese Office Action dated Dec. 9, 2008.
Supplementary European Search Report dated May 11, 2009.

* cited by examiner

*Primary Examiner*—Robert J Hill, Jr.
*Assistant Examiner*—Brian McCaig
(74) *Attorney, Agent, or Firm*—Sughrue Mion, PLLC

(57) ABSTRACT

There is provided a catalyst for hydrotreating a hydrocarbon oil, which comprises an inorganic oxide support containing a certain amount of phosphorus oxide having provided thereon: at least one selected from metals in the Group 6 of the periodic table, at least one selected from metals in the Group 8 of the periodic table, and carbon, and which has a certain specific surface area, pore volume, and mean pore diameter, a process for producing the same, and a method for hydrotreating a hydrocarbon oil using the same.

Thereby, the catalyst can be produced in a simple and convenient manner and sulfur compounds in the hydrocarbon oil can be exceedingly highly desulfurized and simultaneously nitrogen compounds can be diminished without necessitating severe operating conditions.

15 Claims, No Drawings

CATALYST FOR HYDROTREATING HYDROCARBON OIL, PROCESS FOR PRODUCING THE SAME, AND METHOD FOR HYDROTREATING HYDROCARBON OIL

TECHNICAL FIELD

The present invention relates to a catalyst for hydrotreating a hydrocarbon oil (hereinafter, sometimes simply referred to as "hydrotreating catalyst"), a process for producing the same, and a method for hydrotreating a hydrocarbon oil using the hydrotreating catalyst. More specifically, it relates to a hydrotreating catalyst having such excellent desulfurization activity and denitrification activity in hydrotreating a hydrocarbon oil that it can reduce sulfur compounds and nitrogen compounds contained in the hydrocarbon oil to a level lower than those attained in the case that this kind of conventional hydrotreating catalysts are used, and to a process for producing the same and a method for hydrotreating a hydrocarbon oil using the hydrotreating catalyst.

BACKGROUND ART

Recently, a global trend toward stricter quality regulation values for petroleum products (hydrocarbon oils) has emerged to improve atmospheric environments. For example, a reduction of sulfur compounds in gas oils is desirable because sulfur may adversely affect the durability of after-treatment apparatus expected to provide effective control of diesel emissions, such as oxidation catalysts, nitrogen oxide (NOx) reduction catalysts, and continuous regeneration-type filters for removing particulate matter from diesel exhausts.

Under these circumstances, develop of a technique of ultra-deep desulfurization for reducing most of the sulfur compounds in a hydrocarbon oil is being regarded as important. A possible technique generally usable for reducing the sulfur compounds of a hydrocarbon oil is to use severer operating conditions for hydrodesulfurization, e.g., reaction temperature and liquid hourly space velocity. However, when reaction temperature is elevated, a carbonaceous matter precipitates on the catalyst and hence catalytic activity rapidly decreases. Moreover, use of a lowered liquid hourly space velocity results in a decreased purification ability although desulfurization is enhanced, so that it becomes necessary to enlarge the scale of the facility.

Consequently, the best way of attaining the ultra-deep desulfurization of a hydrocarbon oil without using severer operating conditions is to develop a catalyst having an excellent desulfurization activity.

Many investigations are recently being made on various subjects such as the kinds of active metals, methods of active-metal impregnation, improvements of catalyst supports, regulation of catalyst pore structures, and activation methods, and the following results of development have been reported and known on novel deep desulfurization of a gas oil as one example.

For example, there has been known a process for producing a catalyst which comprises impregnating a support with a solution containing a compound of a metal in the Group 6 of the periodic table (hereinafter simply referred to as "Group 6 metal"), a phosphorus component, a compound of a metal in the Group 8 of the periodic table (hereinafter simply referred to as "Group 8 metal"), and an organic acid, followed by drying at a temperature of 200° C. or lower (see, Patent Documents 1 and 2).

Moreover, there has been known a catalyst containing an oxide support and a salt or complex of a Group 8 metal selected from cobalt and nickel and a heteropolyacid of a Group 6 metal selected from molybdenum and tungsten thereon, wherein a concentration of the Group 8 metal is from 2 to 20% by weight in the basis of the support, a concentration of the Group 6 metal is from 5 to 50% by weight in the basis of the support, and free water is substantially not present (see. Patent Document 3).

Furthermore, there has been known a catalyst comprising a support and a Group 6 metal and a Group 8 metal thereon, which is obtained by adding a hydroxycarboxylic acid in an amount of 0.3 to 5.0 equivalents to total number of moles of the Group 6 metal and the Group 8 metal, followed by drying at a temperature of 200° C. or lower (see, Patent Document 4).

As above, there have been proposed various catalysts and processes for producing the same and also proposed catalysts having higher desulfurization activity which can be produced in a simple and convenient manner and with which the ultra-deep desulfurization of a hydrocarbon oil can be realized without using severer operating conditions. However, it is still desired to develop a catalyst having further improved activity and a longer catalyst life.

Patent Document 1: JP-A-2003-299960
Patent Document 2: WO04054712A1
Patent Document 3: JP-A-6-31176
Patent Document 4: Japanese Patent No. 3244692

DISCLOSURE OF THE INVENTION

Problems that the Invention is to Solve

An object of the present invention is to provide a hydrotreating catalyst which can be produced in a simple and convenient manner and which can highly desulfurize sulfur compounds in the hydrocarbon oil and can simultaneously diminish nitrogen compounds without necessitating severe operating conditions, and to provide a process for producing the same. Moreover, another object of the invention is to provide a method for hydrotreating a hydrocarbon oil at a high efficiency.

Means for Solving the Problems

The present inventors made intensive investigations in order to accomplish those objects. As a result, it has been found that a catalyst having a specific composition and specific physical properties obtainable by impregnating an inorganic oxide support containing a phosphorus oxide in a predetermined amount with a solution containing a compound of a Group 6 metal, a compound of a Group 8 metal, and an organic acid to support these compounds thereon in predetermined amounts and drying the whole at a temperature of 200° C. or lower does not yield inactive forms of cobalt or nickel and highly active desulfurization metal sites (e.g., CoMoS phase type II, NiMoS phase type II, etc., which refer to Co and Ni active sites present at edges of the second or higher layers of molybdenum disulfide and type I refers to Co and Ni active sites present at edges of the first layer of molybdenum disulfide, which is lower in activity than type II) can be precisely regulated. As a result, the catalyst is a highly active desulfurization catalyst which facilitates an ultra-deep desulfurization reaction without using severer reaction conditions because the desulfurization reaction and a denitrification reaction proceed efficiently with the catalyst.

Namely, in order to accomplish the above objects, the present invention provides a catalyst for hydrotreating a hydrocarbon oil, a process for producing the catalyst, and a method for hydrotreating a hydrocarbon oil using the catalyst as follows.

(1) A catalyst for hydrotreating a hydrocarbon oil, which comprises an inorganic oxide support containing a phosphorus oxide in an amount of 15% by weight or less on the basis of the support and having provided thereon:

at least one selected from metals in the Group 6 of the periodic table in an amount of from 10 to 40% by weight, at least one selected from metals in the Group 8 of the periodic table in an amount of from 1 to 15% by weight, and carbon in an amount of from 2 to 14% by weight, in terms of respective oxides on the basis of the catalyst, which has a specific surface area of from 100 to 400 m²/g, a pore volume of from 0.2 to 0.6 ml/g, and an mean pore diameter of from 50 to 200 Å.

(2) The catalyst for a hydrotreating hydrocarbon oil according to the above (1), wherein a ratio by weight between the metal in the Group 8 of the periodic table and the metal in the Group 6 of the periodic table as a value of [metal in the Group 8]/[(metal in the Group 8)+(metal in the Group 6)] is from 0.1 to 0.25 in terms of respective oxides.

(3) The catalyst for hydrotreating a hydrocarbon oil according to the above (1) or (2), wherein, when a line analysis in the crosswise direction of cross-section through the center using an electron probe microanalysis (EPMA) apparatus, a phosphorus atom distribution satisfies the following equation (1):

$$S=\exp(0.04\times Iave.+0.013\times Imax-0.014\times Imin)\leq 5.0 \quad (1)$$

(wherein Imax is a maximum value of the measured value of the concentration of the phosphorus atom by EPMA line analysis, Imin is a minimum value of the measured value of the concentration of the phosphorus atom by EPMA line analysis, and Iave is an average value of the measured value of the concentration of the phosphorus atom by EPMA line analysis.)

(4) A process for producing the catalyst for hydrotreating a hydrocarbon oil according to any one of the above (1) to (3), which comprises supporting a metal in the Group 6 of the periodic table so as to be at from 10 to 40% by weight, a metal in the Group 8 of the periodic table so as to be at from 1 to 15% by weight, and carbon so as to be at from 2 to 14% by weight in terms of respective oxides on the basis of the catalyst, using a solution containing a compound containing at least one selected from metals in the Group 8 of the periodic table, a compound containing at least one selected from metals in the Group 6 of the periodic table, and an organic acid, on an inorganic oxide support containing a phosphorus oxide at 15% by weight or less on the basis of the support which has a specific surface area of from 230 to 500 m²/g, a pore volume of from 0.5 to 1 ml/g, and an mean pore diameter of from 40 to 180 Å, followed by drying at 200° C. or lower.

(5) The process for producing the catalyst for hydrotreating a hydrocarbon oil according to the above (4), wherein the above inorganic oxide support containing a phosphorus oxide is prepared by a kneading method of kneading a starting material of the inorganic oxide support and a starting material of the phosphorus oxide.

(6) The process for producing the catalyst for hydrotreating a hydrocarbon oil according to the above (4) or (5), wherein the above inorganic oxide support containing a phosphorus oxide is prepared by calcining at from 400° C. to 700° C. for from 0.5 to 10 hours.

(7) A method for hydrotreating a hydrocarbon oil, wherein a catalytic reaction is carried out at a hydrogen partial pressure of from 0.7 to 8 MPa, a temperature of from 220 to 420° C., a liquid hourly space velocity of from 0.3 to 10 hr$^{-1}$ in the presence of the catalyst for hydrotreating a hydrocarbon oil according to any one of the above (1) to (3).

BEST MODE FOR CARRYING OUT THE INVENTION

Oils to be treated in the present invention are suitably straight-run naphtha, catalytically modified naphtha, catalytically cracked naphtha, catalytically cracked gasoline, straight-run kerosene, straight-run gas oil, catalytically cracked gas oil, thermally cracked gas oil, hydrotreated gas oil, desulfurized gas oil, vacuum distillation gas oil (VGO), and the like. Representative examples of properties of such feedstock oils include a boiling point range of from 30 to 560° C. and a concentration of sulfur compounds of 5% by weight or lower.

In the invention, in order to improve desulfurization activity, an inorganic oxide support containing a predetermined amount of a phosphorus oxide is used as the inorganic oxide support. As the inorganic oxide support, various inorganic oxides can be used but inorganic oxides containing alumina as the main component are preferred. For incorporating the phosphorus oxide into the inorganic oxide containing alumina as the main component to be a support, a preparation method is not particularly limited and the incorporation can be effected by a equilibrium absorption method, a co-precipitation method, a kneading method, and the like. In view of obtaining a catalyst having a high desulfurization activity, it is preferably carried out by the kneading method of kneading an alumina gel as a starting material of the support and a starting material of the phosphorus oxide. At that time, the starting material of the phosphorus oxide is preferably used as an aqueous solution.

A content of the phosphorus oxide in the inorganic oxide support is not particularly limited as far as it is 15% by weight or lower on the basis of the support and is usually in the range of from 0.1 to 15% by weight, preferably from 0.5 to 15% by weight, more preferably from 1 to 13% by weight, further preferably from 1 to 10% by weight. When the content of the phosphorus oxide is 15% by weight or lower, the sites on the alumina surface on which molybdenum disulfide is arranged are not narrowed. As a result, sintering (aggregation) of molybdenum disulfide does not occur, the area of the edges of molybdenum disulfide crystals does not diminished, and absolute number of CoMoS phases and NiMoS phases as desulfurization active sites does not decrease, so a high desulfurization activity can be maintained. On the other hand, when the content of the phosphorus oxide is 0.1% by weight or higher, an effect of enhancing desulfurization activity by the addition is obtained and hence the case is preferred.

By controlling the content of the phosphorus oxide to the above range, a catalyst having a high desulfurization catalyst is obtained.

As the starting materials of the phosphorus oxides, various compounds may be used. For example, orthophosphoric acid, metaphosphoric acid, pyrophosphoric acid, triphosphoric acid, and tetraphosphoric acid may be mentioned but orthophosphoric acid is particularly preferred.

Examples of the alumina to be used as the support include various aluminas such as α-alumina, γ-alumina, δ-alumina, and alumina hydrate. However, an alumina which is porous and has a large specific surface area is preferred. In particular, γ-alumina is suitable. Aluminas having a purity of generally about 98% by weight or higher, preferably about 99% by weight or higher, are preferable. Examples of impurities contained in aluminas include $SO_4^{2-}$, $Cl^-$, $Fe_2O_3$, $Na_2O$, and the like. The lower the content of these impurities, the more preferable the alumina is. The total content of all impurities is preferably 2% by weight or lower, more preferably 1% by weight or lower. The content of each impurity is preferably as follows: $SO_4^{2-}$<1.5% by weight and $Cl^-$, $Fe_2O_3$, $Na_2O$<0.1% by weight.

Another oxide component is preferably added to the alumina and the other oxide component is preferably one or more selected from zeolites, boria, silica, and zirconia. Use of them as components of a composite is advantageous in forming multi-layers of molybdenum disulfide. Among them, zeolites have an average particle diameter as determined by the Coulter counter method (1 wt % aqueous NaCl solution; aperture, 30 μm; ultrasonic treatment, 3 minutes) of about from 2.5 to 6 μm, preferably about from 3 to 4 μm. In the zeolites, the proportion of particles having a particle diameter of 6 μm or smaller is generally about from 70 to 98%, preferably about from 75 to 98%, more preferably about from 80 to 98%, based on all zeolites particles.

Such properties of zeolites are advantageous for precisely regulating the pore diameter so that substances which are difficult to desulfurize can easily diffuse into the pores. To the contrary, for example, when the average particle diameter is too large or the content of particles having large particle diameter is too large, in the process of preparing the inorganic oxide support, the alumina hydrate (alumina precursor) and the zeolite show different degrees of shrinkage during calcination of the inorganic oxide support due to a difference in water adsorption or crystallinity between the alumina hydrate and the zeolite, and this phenomenon tends to give an inorganic oxide support having relatively large pores, i.e., meso- or macropores. Moreover, the large pores not only reduce the specific surface area but also enable metallic components functioning as a catalyst poison to readily diffuse into the pores in such a case that the catalyst is used for the treatment of bottom oils. As a result, such large pores tend to result in decrease in desulfurization, denitrification, and cracking activities.

In the invention, preferred examples of zeolites to be added to an alumina include faujasite X-type zeolite, faujasite Y-type zeolite, β-zeolite, mordenite zeolite, ZSM-series zeolites (ZSM-4, 5, 8, 11, 12, 20, 21, 23, 34, 35, 38, 46, etc.), MCM-41, MCM-22, MCM-48, SSZ-33, UTD-1, CIT-5, VPI-5, TS-1, TS-2, and the like. Especially preferred are Y-type zeolite, stabilized Y-type zeolite, and β-zeolite. Furthermore, proton type zeolites are preferred as zeolites.

As the above boria, silica, and zirconia can be used ones generally employed as support components of this kind of catalyst.

The above zeolites, boria, silica, and zirconia may be used alone or in combination of two or more thereof.

The amount of the other oxide components to be incorporated is generally from 0.5 to less than 20% by weight relative to from higher than 65 to 99.4% by weight of the alumina and from 0.1% by weight to 15% by weight of the phosphorus oxide, preferably from 0.5 to 15% by weight relative to from 70 to 99% by weight of the alumina and from 0.5% by weight to 15% by weight of the phosphorus oxide, and more preferably from 0.5 to 10% by weight relative to from 80 to 98.5% by weight of the alumina and from 1% by weight to 10% by weight of the phosphorus oxide.

When the amount of the other oxide components to be incorporated falls within the above range, pore diameter regulation can be suitably achieved, Brφnsted acid sites or Lewis acid sites can be sufficiently imparted, and Group 6 metals, especially molybdenum, can be highly dispersed.

The inorganic oxide support containing a predetermined amount of the phosphorus compound in the invention is prepared through calcination which is conducted at from 400 to 700° C. for from 0.5 to 10 hours.

The catalyst of the invention is prepared by merely drying at 200° C. or lower after supporting active components on the inorganic oxide support, as will be described later. Accordingly, in order to obtain the mechanical properties of the catalyst (e.g., side crushing strength, compacted bulk density, etc.), the inorganic oxide support is calcined. When calcination is conducted at a temperature lower than 400° C. for a period shorter than 0.5 hours, sufficient mechanical strength cannot be obtained. Even when calcination is conducted at a high temperature exceeding 700° C. for a prolonged period exceeding 10 hours, not only the effects are saturated but also heat densification may occur to lower properties of the inorganic oxide support, such as specific surface area, pore volume, and mean pore diameter.

The specific surface area, pore volume, and mean pore diameter of the inorganic oxide support should be as follows so as to enable the catalyst to have high activity in the hydrodesulfurization of hydrocarbon oils: the specific surface area is from 230 to 500 $m^2/g$, preferably from 270 to 500 $m^2/g$, the pore volume is from 0.5 to 1 ml/g, preferably from 0.55 to 0.9 ml/g, and the mean pore diameter is from 40 to 180 Å. The reasons for those property ranges are as follows.

The Group 6 metal and Group 8 metal are thought to form a complex in the impregnating solution. Accordingly, when the specific surface area of the inorganic oxide support is smaller than 230 $m^2/g$, it is difficult to highly disperse each metal in impregnation because of the bulkiness of the complex. As a result, it would be difficult to precisely regulate the formation of the aforementioned active sites (e.g., CoMoS phase, NiMoS phase, or the like) even when the resulting catalyst is subjected to sulfidation. When the specific surface area is 500 $m^2/g$ or smaller, the pore diameter is not exceedingly small and hence the pore diameter of the catalyst is not small, so that the case is preferred. When the pore diameter is small, desulfurization activity decreases because the diffusion of sulfur compounds into the catalyst pores is insufficient.

When the pore volume is 0.5 ml/g or more, the amount of the solvent infiltrating into the pores is not small when a catalyst is prepared by the ordinary-impregnation method, so that the case is preferred. When the solvent amount is small, the compounds of active metals show poor solubility, resulting in impaired metal dispersibility to give a catalyst having low activity. Although there is a method of adding a large amount of an acid, e.g., nitric acid for enhancing the solubility of the compounds of active metals, the addition of the acid, in too large an amount results in a reduction of the surface area of the support and this is a major cause of a decrease in desulfurization activity. When the pore volume is 1 ml/g or smaller, the specific surface area is not exceedingly small and the active metals show good dispersibility, resulting in a catalyst having high desulfurization activity, so that the case is preferred.

When the mean pore diameter is 40 Å or larger, the pore diameter of the catalyst on which active metal is supported also is not small and hence the case is preferred. When the pore diameter of the catalyst is small, desulfurization activity decreases because the diffusion of sulfur compounds into the catalyst pores is insufficient. When the mean pore diameter is 180 Å or smaller, the specific surface area of the catalyst is not small and hence the case is preferred. Moreover, in order to increase an effective number of the pores satisfying the above conditions of the mean pore diameter, a pore distribution of the catalyst, i.e., a ratio of pores having a diameter of an mean pore diameter ±15 Å is to be from 20 to 90%, preferably from 35 to 85%. When the ratio is 90% or smaller, compounds to be desulfurized are not limited to specific sulfur compounds and can be uniformly desulfurized, so that the case is preferred. On the other hand, when the ratio is 20% or larger, pores which do not contribute desulfurization of the hydrocarbon oil do not increase and, as a result, desulfurization activity does not decrease to a large extent, so that the case is preferred.

Moreover, in order to enhance dispersibility of the Group 6 metal and the Group 8 metal to be mentioned below, a phosphorus oxide may be supported on the above support. The starting material of the phosphorus oxide to be supported is preferably the same as that used in the preparation of the support. Examples thereof include orthophosphoric acid, metaphosphoric acid, pyrophosphoric acid, triphosphoric acid, and tetraphosphoric acid, and orthophosphoric acid is particularly preferred. Furthermore, as a method of supporting the phosphorus compound, there may be mentioned a method of impregnating the support with the starting material of the phosphorus compound.

In this connection, the amount of the phosphorus oxide to be supported is determined so that the total amount including the phosphorus oxide used in the preparation of the support does not exceed the maximum content (15% by weight) of the phosphorus oxide in the support as defined in the above. For example, in the case that the support is prepared by a method of kneading the organic oxide and the phosphorus oxide, a part of the phosphorus oxide to be used in the kneading is used as the phosphorus compound for supporting. Moreover, with regard to the active metal, for example, in the case of using molybdenum, a ratio by weight of $[P_2O_5]/[MoO_3]$ is preferably from 0.01 to 1.5, more preferably from 0.05 to 1.0, further preferably from 0.1 to 0.5. When the ratio by weight is 0.01 or larger, Co and Mo can be wholly integrated and, after desulfurization, laminate formation of molybdenum disulfide is achieved. For these two reasons, there are easily obtained CoMoS phase and NiMoS phase which are thought to be finally desulfurization active sites, especially CoMoS phase and NiMoS phase which show high desulfurization activity among desulfurization sites and hence a highly active catalyst is apt to form, so that the case is preferred. When the ratio is 1.5 or smaller, the surface area and pore volume of the catalyst do not decrease and hence the activity of the catalyst does not decrease as well as acid amount does not increase and carbon precipitation is not invited, so that activity deterioration is hardly caused and hence the case is preferred.

The Group 6 metal to be supported in the catalyst of the invention is preferably molybdenum or tungsten, more preferably molybdenum.

The amount of the Group 6 metal to be supported is from 10 to 40% by weight, preferably from 10 to 30% by weight, in terms of an oxide on the basis of the catalyst. When the amount is 10% by weight or larger, it is sufficient for producing the effect attributable to the Group 6 metal and hence the case is preferred. When it is 40% by weight or smaller, no aggregation of the Group 6 metal compound occurs in the step of Group 6 metal impregnation (supporting), resulting in good dispersibility of the Group 6 metal. In addition, this catalyst contains the Group 6 metal in an amount which does not exceed the limit of efficient dispersion and the surface area of the catalyst does not decrease to a large extent. Accordingly, an improvement in catalytic activity is observed and hence the case is preferred.

The Group 8 metal is preferably cobalt or nickel.

The amount of the Group 8 metal to be supported is from 1 to 15% by weight, preferably from 3 to 8% by weight, in terms of an oxide on the basis of the catalyst. When the amount is 1% by weight or larger, active sites attributable to the Group 8 metal can be sufficiently obtained and hence the case is preferred. When the amount is 15% by weight or smaller, aggregation of the Group 8 metal compound does not occur in the step of Group 8 metal impregnation (supporting), resulting in good dispersibility of the Group 8 metal. In addition, it is thought that there are observed no formation of CoO, NiO, etc., which are precursors for $Co_9S_8$ and $Ni_3S_2$, which are inactive forms of the Group 8 metals such as cobalt and nickel, and no formation of a cobalt spinel, nickel spinel, or the like incorporated in support lattices. Accordingly, the catalytic activity is improved and hence the case is preferred. Moreover, when cobalt and nickel are used as the Group 8 metals, it is desired to use them so that a molar ratio of Co/(Ni+Co) is in the range of from 0.6 to 1, more preferably in the range of from 0.7 to 1. When the ratio is 0.6 or larger, coke precursor is not formed on Ni, the catalytically active sites are not covered with coke, and hence activity does not decreases, so that the case is preferred.

The optimal ratio by weight of the Group 8 metal to the Group 6 metal, which are contained in the respective amounts shown above, is such that the ratio of [the Group 8 metal]/[the Group 8 metal+the Group 6 metal] in terms of an oxide is preferably from 0.1 to 0.25. When the ratio is 0.1 or larger, the formation of a CoMoS phase, NiMoS phase, or the like, which are thought to be active sites for desulfurization, is not inhibited, degree of improvement in desulfurization activity is enhanced, so that the case is preferred. When that ratio is 0.25 or smaller, the formation of the aforementioned inactive form of cobalt or nickel ($Co_9S_8$ or $Ni_3S_2$, etc.) is inhibited and catalytic activity is improved, so that the case is preferred.

The amount of carbon to be supported is from 2 to 14% by weight on the basis of the catalyst. The carbon is derived from organic acid, preferably citric acid. When the amount is 2% by weight or larger, the Group 8 metal sufficiently forms a complex compound with the organic acid on the catalyst surface. In this case, the Group 6 metal which is not in the form of a complex is sulfided prior to the sulfidation of the Group 8 metal in the step of presulfiding. Thereby, it is presumed that CoMoS phase and NiMoS phase, which are thought to be active sites for desulfurization, are sufficiently formed and hence $CO_9S_8$ or $Ni_3S_2$, which are inactive forms of the Group 8 metals such as cobalt and nickel, and a cobalt spinel, nickel spinel, or the like incorporated in support lattices are not yielded, so that the case is preferred. When the amount is 14% by weight or smaller, the Group 8 metal can sufficiently form a complex compound with the organic acid on the catalyst surface. In this case, however, the Group 6 metal does not form a complex compound with the organic acid, and also the excess carbon derived from the organic acid does not remain on the catalyst surface, so that the case is preferred. When the Group 6 metal has formed a complex with the organic acid, the Group 6 metal is sulfided simultaneously with the sulfidation of the Group 8 metal in the activation (sulfidation) and it is presumed that in the sulfidation, CoMoS phase and NiMoS phase, which are thought to be active sites for desulfurization, are not efficiently formed, leading to the formation of inactive $Co_9S_8$ or $Ni_3S_2$. Furthermore, the excess carbon is causative of a decrease in activity because it functions as a catalyst poison to cover desulfurization-active sites during sulfidation stage.

In order to obtain the catalyst of the invention, a process is carried out, which comprises supporting, on an inorganic oxide support containing a predetermined amount of a phosphorus oxide comprising the aforementioned components and having the aforementioned properties, a Group 6 metal, a Group 8 metal, and carbon so as to be the aforementioned supported amounts using a solution containing a compound containing at least one of the aforementioned Group 6 metals, a compound containing at least one of the aforementioned Group 8 metals, and an organic acid, followed by drying. For example, the process is accomplished by impregnating the inorganic oxide support with a solution containing the compounds and the like, followed by drying. Specifically, for example, the catalyst is obtained by a method which comprises impregnating an inorganic oxide with a solution containing these compounds, followed by drying.

The compound containing a Group 6 metal to be used in the above impregnating solution includes molybdenum trioxide, molybdophosphoric acid, ammonium molybdate, molybdic acid, and the like. Molybdenum trioxide and molybdophosphoric acid are preferred. Such compounds are added to the above impregnating solution in such an amount that the catalyst contains the Group 6 metal in an amount within the range shown hereinabove.

The compound containing a Group 8 metal includes cobalt carbonate, nickel carbonate, cobalt citrate, nickel citrate, cobalt nitrate hexahydrate, nickel nitrate hexahydrate, and the like. Cobalt carbonate, nickel carbonate, cobalt citrate, and nickel citrate are preferred. Cobalt citrate and nickel citrate are particularly preferred.

The above cobalt citrate includes cobaltous citrate ($Co_3(C_6H_5O_7)_2$), cobalt hydrogen citrate ($CoHC_6H_5O_7$), cobalt citrate oxysalt ($Co_3(C_6H_5O_7)_2 \cdot CoO$), and the like. The nickel citrate includes nickelous citrate ($Ni_3(C_6H_5O_7)_2$), nickel hydrogen citrate ($NiHC_6H_5O_7$), nickel citrate oxysalt ($Ni_3(C_6H_5O_7)_2 \cdot NiO$), and the like.

The citric acid compounds of cobalt and nickel can be produced in the following manner. In the case of cobalt, for example, the compounds are obtained by dissolving cobalt carbonate in an aqueous solution of citric acid. A citric acid compound obtained by such a method may be used as it is in catalyst preparation without removing the water therefrom.

These compounds are added to the above impregnating solution in such an amount that the resulting catalyst contains the Group 8 metal in an amount within the range shown hereinabove.

The organic acid includes citric acid monohydrate, citric anhydride, isocitric acid, malic acid, tartaric acid, oxalic acid, succinic acid, glutaric acid, adipic acid, benzoic acid, phthalic acid, isophthalic acid, salicylic acid, malonic acid, and the like. Citric acid monohydrate is preferred. It is important to use compounds containing substantially no sulfur as these organic acids.

When citric acid is used as the organic acid, the citric acid may be in the form of citric acid alone or may be in the form of a citric acid compound with cobalt or nickel (Group 8 metal), such as those enumerated above.

It is important that the organic acid should be added in such an amount that the resulting catalyst contains residual carbon in an amount within the range shown above. It is suitable that the addition amount of the organic acid relative to the Group 8 metal is such that the molar ration of organic acid/Group 8 metal is from 0.2 to 1.2. When this molar ratio is 0.2 or larger, active sites attributable to the Group 8 metal are sufficiently obtained and hence the case is preferred. When that ratio is 1.2 or smaller, the impregnating solution does not have a high viscosity and this not only does not require a longer time period for the supporting step but also may result in infiltration of the active metals into inner parts of the support pellets, so that good dispersion of the active metals is observed and hence the case is preferred.

It is also suitable that the addition amount of the organic acid relative to the total of the Group 6 metal and the Group 8 metal is such that a molar ratio of the organic acid/[(Group 6 metal)+(Group 8 metal)] is 0.35 or lower, preferably 0.3 or lower. When the ratio is 0.35 or lower, the excess organic acid which has not formed a complex with a metal does not remain on the catalyst surface and hence the case is preferred. When the excess organic acid remains on the catalyst surface, the acid may flow out together with a feedstock oil in the sulfidation step in some cases and thus the case is not preferred.

When the compound of a Group 6 metal or the compound of a Group 8 metal does not sufficiently dissolve in the impregnating solution, an acid may be used, such as nitric acid, an organic acid (e.g., citric acid, malic acid, tartaric acid, etc.)), together with that compound. An organic acid is preferably used. When an organic acid is used, there are cases where carbon derived from the acid remains in the catalyst obtained, so that it is important to regulate the carbon content of the catalyst so as to be within the range shown above.

The solvent for dissolving the above each component in the above impregnating solution is water. When the amount of the solvent used is too small, the support cannot be sufficiently impregnated. When the solvent amount is too large, a part of the active metals dissolved remains adherent to the rim and other parts of the container for the impregnating solution without infiltrating into the support, so that the desired impregnation amount cannot be obtained. Consequently, the amount of the solvent is preferably from 50 to 90 g per 100 g of the support. An impregnating solution is prepared by dissolving the above components in the solvent. On this occasion, a temperature may be higher than 0° C. to 100° C. So long as the temperature is within this range, each compound can be satisfactorily dissolved in the above solvent.

The inorganic oxide support is impregnated with the impregnating solution thus prepared to thereby support above individual components contained in the solution on the inorganic oxide support. The impregnation may be conducted under various conditions. However, in general, the impregnation temperature is preferably higher than 0° C. and lower than 100° C. The impregnation period is from 15 minutes to 3 hours, preferably from 20 minutes to 2 hours, and more preferably from 30 minutes to 1 hour. When the impregnation temperature is too high, drying may occur during the impregnation, resulting in unevenness of the degree of dispersion. It is preferred to stir the mixture during the impregnation.

The water contained in the impregnated support is removed to some degree (to LOI (loss on ignition) of about 50% or lower) at a temperature of from room temperature to about 80° C. in a nitrogen or air stream or under vacuum. Thereafter, drying is conducted in an air or nitrogen stream or under vacuum at a temperature of 200° C. or lower for a period of from 5 hours to 20 hours. When the drying is conducted at a temperature of 200° C. or lower, the organic acid, which is thought to be in the form of a complex with a metal, is not released from the catalyst surface and, as a result, it is easy to precisely regulate the formation of CoMoS phase and NiMoS phase, which are thought to be the above active sites for desulfurization, when the resulting catalyst is subjected to sulfidation, so that the case is preferred. However, when the drying is conducted under vacuum, the drying is preferably conducted at a temperature range which corresponds the above temperature range in terms of pressure at 760 mmHg.

In the invention, the catalyst obtained by supporting predetermined amounts of a Group 6 metal, a Group 8 metal, and carbon on an inorganic oxide support containing a predetermined amount of a phosphorus oxide, followed by drying at a predetermined temperature has a specific surface area of from 100 to 400 m$^2$/g, preferably from 150 to 350 m$^2$/g, a pore volume of from 0.2 to 0.6 ml/g, preferably from 0.3 to 0.6 ml/g, more preferably from 0.3 to 0.5 ml/g, and an mean pore diameter of from 50 to 200 Å, preferably from 50 to 180 Å, more preferably from 50 to 150 Å. When respective physical properties of the specific surface area, pore volume, and mean pore diameter of the catalyst fall within the above ranges, a desired catalytic activity is attained and expected objects can be achieved. The control of the above respective physical properties within the above ranges can be easily achieved by selecting the above respective physical properties of the inorganic oxide support containing a phosphorus oxide to be used within the above ranges of the above respective physical properties regarding to the above support, regulating the supporting amounts of the necessary supporting components such as the Group 6 metal and the Group 8 metal within the above ranges, and regulating drying conditions after supporting of the necessary components within the above ranges in the catalyst preparation.

Furthermore, in the catalyst of the invention, the phosphorus atom is highly dispersed. When EPMA line analysis of the phosphorus atom is conducted from one surface of cross-section of the catalyst to the opposite surface though the center, an S value represented by the following equation (1), which is a measure of dispersibility of the phosphorus atom, is 5 or lower, preferably 4 or lower, more preferably 3 or lower. The lower S value shows a homogeneous dispersion of the phosphorus atom. When the S value is 5 or lower, a highly dispersed state of the phosphorus atom is maintained and active metals are highly dispersed, so that desulfurization activity does not decreases and hence the case is preferred. In the case that a phosphorus oxide is further supported on the support, the phosphorus atom is present on the surface layer of the catalyst in a large amount. Even in that case, the supporting amount, supporting conditions, and the like of the phosphorus oxide are controlled so that the equation (1) is satisfied.

In this connection, Imax is a maximum value of the measured value of the concentration of the phosphorus atom by EPMA line analysis, Imin is a minimum value of the measured value of the concentration of the phosphorus atom by EPMA line analysis, and Iave. is an average value of the measured value of the concentration of the phosphorus atom by EPMA line analysis.

$$S=\exp(0.04\times Iave.+0.013\times Imax-0.014\times Imin)\leq 5.0 \quad (1)$$

Moreover, in the catalyst of the invention, an average number of laminating layers of Group 6 metal disulfide such as molybdenum disulfide observed through a transmission electron microscope after sulfidation is preferably from 2.5 to 5.

Namely, the layers of molybdenum disulfide or the like are formed on the inorganic oxide support to play a role of increasing a contact area of the catalyst and also active sites such as a CoMoS phase or NiMoS phase is formed in the layers. In the case of the catalyst having an average number of laminating layers of 2.5 or higher, a ratio of type I of the CoMoS phase or NiMoS phase having low activity is not high and high activity is exhibited, so that the case is preferred. Moreover, in the case of the catalyst having an average number of laminating layers of 5 or lower, highly active type II of the CoMoS phase or NiMoS phase is formed, absolute number of the active sites does not decrease, and high activity is exhibited, so that the case is preferred.

In this connection, as a photograph of the transmission electron microscope to be used for analysis, there is used one where 200 or more crystals of the Group 6 metal disulfide such as molybdenum disulfide per one field of view can be observed visually.

Furthermore, an in-plane-direction length of the layer of Group 6 metal disulfide such as molybdenum disulfide observed through a transmission electron microscope is suitably from 1 to 3.5 nm, preferably from 2 to 3.5 nm on average.

When the length is 1 nm or longer, the cobalt or nickel can form a square pyramid type pentacoordinate sulfur structure because the molecules of molybdenum disulfide or the like are not present, only as single molecules. Consequently, a CoMoS phase or NiMoS phase serving as active sites can be formed and hence the case is preferred. When the length is 3.5 nm or shorter, the absolute number of edges is not reduced because the crystals of molybdenum disulfide or the like is not large. As a result, a CoMoS phase or NiMoS phase serving active sites can be secured in a sufficient number and hence the case is preferred.

In this connection, as a photograph of the transmission electron microscope to be used for analysis, there is similarly used one where 200 or more crystals of the Group 6 metal disulfide such as molybdenum disulfide per one field of view can be observed visually.

The shape of the catalyst in the invention is not particularly limited, and any shapes ordinarily used for this kind of catalyst, for example, a cylindrical, trilobe, and quadlobe shape can be employed. The size of the catalyst is preferably such that the diameter is about from 1 to 2 mm and the length is about from 2 to 5 mm.

The mechanical strength of the catalyst, in terms of side crushing strength (SCS), is preferably about 2 lbs/mm or higher. When the SCS is about 2 lbs/mm or higher, there does not occur an event that the catalyst packed into a reactor are destroyed to cause a pressure difference within the reactor and thereby the continuation of hydrotreating operation becomes impossible.

The compacted bulk density (CBD) of the catalyst is preferably from 0.6 to 1.2 g/ml.

The state of distribution of the active metals in the catalyst is preferably of the uniform type in which the active metals are homogeneously distributed in the catalyst.

The hydrotreatment of the invention is a method which comprises bringing a hydrocarbon oil containing sulfur compounds into contact with the catalyst under the conditions of a hydrogen partial pressure of from 0.7 to 8 MPa, a temperature of from 220 to 420° C., a liquid hourly space velocity of from 0.3 to 10 hr$^{-1}$, and a hydrogen/oil ratio of from 20 to 1000 m$^3$ (normal)/kl to desulfurize the hydrocarbon oil and thereby diminish the sulfur compounds, including sulfur compounds difficult to remove, contained in the hydrocarbon oil.

By the hydrotreatment of the invention, there can be obtained a product oil having a sulfur content of 10 ppm by weight or lower for a hydrocarbon oil of naphtha, kerosene, or gas oil fraction. Moreover, for vacuum gas oil, there can be obtained a product oil having a reduced sulfur content of 0.3% by weight or lower, preferably 0.07% by weight or lower, the sulfur content being originally about from 1 to 4% by weight, although it varies depending on crude oils.

For practicing the hydrotreatment method of the invention on a commercial scale, a fixed-bed, moving-bed, or fluidized-bed type catalyst layer comprising the catalyst of the invention may be disposed in a reactor. Then, hydrotreatment may be accomplished by introducing a feedstock oil into this reactor and reacting it under the conditions described above.

Most commonly, a fixed-bed catalyst layer is disposed in a reactor and a feedstock oil is introduced into an upper part of the reactor and passed through the fixed bed from the upper to the lower side thereof. The product oil is discharged from an lower part of the reactor.

The method of the invention may be a single-stage hydrotreatment method wherein the treatment is conducted in a single reactor packed with the catalyst of the invention, or may be a multistage successive hydrotreatment method wherein several reactors packed with the catalyst are used to conduct the treatment.

Before use (i.e., prior to the hydrotreatment method of the invention), the catalyst of the invention is activated by sulfidation in the reactor. The sulfidation is conducted with a sulfur compound-containing petroleum distillate, the distillate containing, added thereto, a sulfiding agent such as dimethyl disulfide or carbon disulfide, or hydrogen sulfide under a hydrogen atmosphere of ordinary pressure or higher at a temperature of from 200 to 400° C., preferably from 250 to 350° C.

EXAMPLE

The following will describe the invention with reference to Examples but the invention is not limited by these Examples.

Example 1

Silica was kneaded together with alumina hydrate and orthophosphoric acid, and the resulting mixture was extrusion-molded and then calcined at 600° C. for 2 hours to obtain a phosphorus oxide-silica-alumina composite support in the form of cylindrical moldings having a diameter of 1/16 inch (phosphorus oxide-silica/alumina weight ratio, 4/1/95; pore volume, 0.70 m²/g; specific surface area, 398 m²/g; mean pore diameter, 62 Å).

To 20.1 g of ion-exchanged water were added 7.98 g of cobalt nitrate hexahydrate, 3.84 g of citric acid monohydrate, and 11.09 g of ammonium molybdate, followed by heating to 80° C. and stirring for 10 minutes to obtain a solution for impregnation.

Into an eggplant type flask was introduced 30.0 g of the above phosphorus oxide-silica-alumina composite support. The whole impregnating solution was added thereto with a pipette and the support was immersed in the solution at about 25° C. for 3 hours.

Thereafter, the support was allowed to dry in a nitrogen stream and then dried in a muffle furnace at 120° C. for about 16 hours to obtain Catalyst A.

Example 2

A powder of zeolite SHY having an $SiO_2/Al_2O_3$ molar ratio of 6 (average particle diameter, 3.5 μm; 87% of all zeolite particles was accounted for by ones having a particle diameter of 6 μm or smaller) was kneaded together with alumina hydrate and orthophosphoric acid, and the resulting mixture was extrusion-molded and then calcined at 600° C. for 2 hours to obtain a phosphorus oxide-zeolite-alumina composite support in the form of cylindrical moldings having a diameter of 1/16 inch (phosphorus oxide/zeolite/alumina weight ratio, 4/7/89; pore volume, 0.70 ml/g; specific surface area, 412 m²/g; mean pore diameter, 63 Å).

To 38.9 g of ion-exchanged water were added 5.44 g of cobalt carbonate, 12.81 g of citric acid monohydrate, and 15.07 g of molybdenum trioxide, followed by heating to 80° C. and stirring for 10 minutes to obtain a solution for impregnation.

Into an eggplant type flask was introduced 50.0 g of the above zeolite-alumina composite support. The whole impregnating solution was added thereto with a pipette and the support was immersed in the solution at about 25° C. for 3 hours.

Thereafter, the support was allowed to dry in a nitrogen stream and then dried in a muffle furnace at 120° C. for about 16 hours to obtain Catalyst B.

Example 3

A powder of zeolite SHY having an $SiO_2/Al_2O_3$ molar ratio of 6 (average particle diameter, 3.5 μm; 87% of all zeolite particles was accounted for by ones having a particle diameter of 6 μm or smaller) was kneaded together with alumina hydrate and orthophosphoric acid, and the resulting mixture was extrusion-molded and then calcined at 600° C. for 2 hours to obtain a phosphorus oxide-zeolite-alumina composite support in the form of cylindrical moldings having a diameter of 1/16 inch (phosphorus oxide/zeolite/alumina weight ratio, 4/7/89; pore volume, 0.70 ml/g; specific surface area, 412 m²/g; mean pore diameter, 63 Å).

To 34.98 g of ion-exchanged water were added 16.07 g of cobaltous citrate and 27.59 g of molybdophosphoric acid, followed by heating to 80° C. and stirring for 10 minutes to obtain a solution for impregnation.

Into an eggplant type flask was introduced 50.0 g of the above zeolite-alumina composite support. The whole impregnating solution was added thereto with a pipette and the support was immersed in the solution at about 25° C. for 3 hours.

Thereafter, the support was allowed to dry in a nitrogen stream and then dried in a muffle furnace at 120° C. for about 16 hours to obtain Catalyst C.

Example 4

Silica was kneaded together with alumina hydrate and orthophosphoric acid, and the resulting mixture was extrusion-molded and then calcined at 600° C. for 2 hours to obtain a phosphorus oxide-silica-alumina composite support in the form of cylindrical moldings having a diameter of 1/16 inch (phosphorus oxide/silica/alumina weight ratio, 3/5/92; pore volume, 0.68 ml/g; specific surface area, 417 m²/g; mean pore diameter, 64 Å).

To 24.60 g of ion-exchanged water were added 7.32 g of cobaltous citrate and 12.59 g of molybdophosphoric acid, followed by heating to 80° C. and stirring for 10 minutes to obtain a solution for impregnation.

Into an eggplant type flask was introduced 30.0 g of the above phosphorus oxide-silica-alumina composite support. The whole impregnating solution was added thereto with a pipette and the support was immersed in the solution at about 25° C. for 3 hours.

Thereafter, the support was allowed to dry in a nitrogen stream and then dried in a muffle furnace at 120° C. for about 16 hours to obtain Catalyst E.

Example 5

Silica was kneaded together with alumina hydrate and orthophosphoric acid, and the resulting mixture was extrusion-molded and then calcined at 600° C. for 2 hours to obtain a phosphorus oxide-silica-alumina composite support in the form of cylindrical moldings having a diameter of 1/16 inch (phosphorus oxide/silica/alumina weight ratio, 4.4/5/90.5; pore volume, 0.78 ml/g; specific surface area, 324 m²/g; mean pore diameter, 98 Å).

To 26.40 g of ion-exchanged water were added 9.81 g of cobaltous citrate and 26.40 g of molybdophosphoric acid, followed by heating to 80° C. and stirring for 10 minutes to obtain a solution for impregnation.

Into an eggplant type flask was introduced 30.0 g of the above phosphorus oxide-silica-alumina composite support. The whole impregnating solution was added thereto with a pipette and the support was immersed in the solution at about 25° C. for 3 hours.

Thereafter, the support was allowed to dry in a nitrogen stream and then dried in a muffle furnace at 120° C. for about 16 hours to obtain Catalyst F.

Example 6

To 25.99 g of ion-exchanged water were added 10.35 g of cobaltous citrate, 25.99 g of molybdophosphoric acid, and phosphoric acid (85% aqueous solution), followed by heating to 80° C. and stirring for 10 minutes to obtain a solution for impregnation.

Into an eggplant type flask was introduced 30.0 g of the phosphorus oxide-silica-alumina composite support obtained in Example 6. The whole impregnating solution was added thereto with a pipette and the support was immersed in the solution at about 25° C. for 3 hours.

Thereafter, the support was allowed to dry in a nitrogen stream and then dried in a muffle furnace at 120° C. for about 16 hours to obtain Catalyst G.

Example 7

Alumina hydrate was extrusion-molded and then calcined at 600° C. for 2 hours to obtain cylindrical moldings having a diameter of 1/16 inch. To 200 g of ion-exchanged water was added 1.5 g of orthophosphoric acid. After the whole was thoroughly stirred, the above cylindrical moldings were added thereto and the whole was allowed to stand for 24 hours. Thereafter, the product was calcined at 600° C. for 2 hours to obtain an alumina support containing a phosphorus oxide (phosphorus oxide/alumina weight ratio, 2/98; pore volume, 0.70 ml/g; specific surface area, 362 m²/g; mean pore diameter, 69 Å).

To 20.3 g of ion-exchanged water were added 7.27 g of cobaltous citrate and 11.10 g of molybdophosphoric acid, followed by heating to 80° C. and stirring for 10 minutes to obtain a solution for impregnation.

Into an eggplant type flask was introduced 30.0 g of the above alumina support containing a phosphorus oxide. The whole impregnating solution was added thereto with a pipette and the support was immersed in the solution at about 25° C. for 3 hours.

Thereafter, the support was allowed to dry in a nitrogen stream and then dried in a muffle furnace at 120° C. for about 16 hours to obtain Catalyst H.

Comparative Example 1

In 21.6 g of ion-exchanged water were dissolved 3.31 g of cobalt carbonate, 11.41 g of molybdophosphoric acid, and 1.17 g of orthophosphoric acid. Thus, a solution for impregnation was prepared.

Into an eggplant type flask was introduced 30.0 g of a γ-alumina support (pore volume, 0.69 ml/g; specific surface area, 364 m²/g; mean pore diameter, 64 Å). The whole impregnating solution was added thereto with a pipette and the support was immersed in the solution at about 25° C. for 1 hour.

Thereafter, the support was allowed to dry in a nitrogen stream, subsequently dried in a muffle furnace at 120° C. for about 1 hour, and then calcined at 500° C. for 4 hours to obtain Catalyst a.

Comparative Example 2

In 21.4 g of ion-exchanged water were dissolved 7.69 g of cobaltous citrate, 12.91 g of molybdophosphoric acid, and 1.46 g of orthophosphoric acid. Thus, a solution for impregnation was prepared.

Into an eggplant type flask was introduced 30.0 g of a γ-alumina support (pore volume, 0.69 ml/g; specific surface area, 364 m²/g; mean pore diameter, 64 Å). The whole impregnating solution was added thereto with a pipette and the support was immersed in the solution at =about 25° C. for 1 hour.

Thereafter, the support was allowed to dry in a nitrogen stream, subsequently dried in a muffle furnace at 120° C. for about 1 hour to obtain Catalyst b.

The chemical properties and physical properties of the catalysts obtained in the above are shown in Table 1.

The number of molybdenum disulfide laminating layers was determined with a transmission electron microscope (TEM) (trade name "JEM-2010" manufactured by JEOL Ltd.) in the following manner.

1) A catalyst was packed into a flow-through type reaction tube. The catalyst packed was held at room temperature in a nitrogen stream for 5 minutes, and the surrounding gas was replaced with a mixture of $H_2S$ (5% by volume) and $H_2$. The catalyst was heated at a rate of 5° C./min. After the catalyst temperature reached 400° C., the catalyst was held for 1 hour and then cooled to 200° C. under the same atmosphere. Subsequently, the surrounding gas was replaced with nitrogen and the catalyst was cooled to room temperature to complete sulfidation.

2) The catalyst after sulfidation was pulverized in an agate mortar.

3) A small portion of the catalyst pulverized was dispersed in acetone.

4) The resulting suspension was dropped onto a microgrid and dried at room temperature to obtain a sample.

5) The sample was set on the examination part of the TEM and examined at an accelerating voltage of 200 kV. The direct magnification was 200,000 diameters, and five fields of view were examined.

6) Each photograph was enlarged so as to result in a magnification of 2,000,000 diameters (size: 16.8 cm×16.8 cm). The number of the molybdenum disulfide laminated layers visually recognized on the photograph was counted.

Additionally, in order to calculate the S value which is a measure of dispersibility of phosphorus contained in the catalyst, EPMA line analysis of the phosphorus atom is conducted from one surface of cross-section of the catalyst to the opposite surface though the center under the following conditions using a JXA-8200 apparatus manufactured by JEOL Ltd.

1) Sample Preparation

A catalyst sample was embedded in a MMA resin and a smooth cross-section of the catalyst was obtained by a cutting method, followed by carbon deposition on the surface.

2) Measuring Conditions

Acceleration voltage: 15 kV

Irradiated current: $1\times10^{-7}$ A
Number of data: 250
Measured interval: 12 μm
[Table 1]

TABLE 1

| | Chemical property | | | | | Physical property | | | | TEM | | EPMA | | | |
| | Amount of supported component | | | | $P_2O_5/$ | SA | PV | MPD | MPD ±15 Å | Average number of laminating | Average in-plane-direction length | | | | |
| Catalyst | CoO | MoO₃ | P₂O₅ | C | MoO₃ | [m2/g] | [ml/g] | [Å] | [%] | layers | (nm) | lave. | lmax. | lmin. | S |
|---|---|---|---|---|---|---|---|---|---|---|---|---|---|---|---|
| A | 5.1 | 22.4 | 0.0 | 5.3 | 0.12 | 306 | 0.41 | 65 | 83 | 3.2 | 3.0 | 19.4 | 22.1 | 16.7 | 1.5 |
| B | 4.9 | 22.0 | 0.0 | 5.1 | 0.12 | 316 | 0.40 | 66 | 85 | 3.4 | 3.1 | 18.4 | 21.2 | 18.3 | 11 |
| C | 5.9 | 26.8 | 0.7 | 5.1 | 0.12 | 281 | 0.36 | 61 | 84 | 4.0 | 3.1 | 19.4 | 28.0 | 15.3 | 2.0 |
| a | 5.0 | 20.0 | 2.7 | 0.0 | 0.14 | 250 | 0.48 | 75 | 81 | 1.9 | 3.6 | 19.4 | 52.0 | 3.4 | 14.7 |
| b | 5.0 | 22.0 | 2.8 | 3.2 | 0.12 | 230 | 0.44 | 85 | 83 | 3.1 | 2.9 | 9.7 | 31.7 | 3.3 | 7.7 |
| E | 4.9 | 22.1 | 0.9 | 3.3 | 0.12 | 289 | 0.49 | 83 | 64 | 3.0 | 3.0 | 19.6 | 28.0 | 15.9 | 1.8 |
| F | 5.9 | 27.3 | 1.1 | 4.0 | 0.14 | 150 | 0.44 | 133 | 51 | 3.4 | 3.1 | 26.2 | 32.4 | 21.2 | 1.2 |
| G | 5.8 | 27.0 | 1.1 | 3.2 | 0.25 | 148 | 0.42 | 128 | 43 | 4.1 | 3.0 | 42.0 | 60.0 | 22.4 | 2.7 |
| H | 5.2 | 21.0 | 0.9 | 3.1 | 0.12 | 260 | 0.40 | 74 | 79 | 3.2 | 2.9 | 19.1 | 21.8 | 16.1 | 2.3 |

Note 1)
Unit of the amount of each supported component is % by weight (on the basis of catalyst).
Note 2)
P₂O₅/MoO₃ is a value including P₂O₅ in the support.
Note 3)
SA is an abbreviation of specific surface area, PV is an abbreviation of pore volume, and MPD is an abbreviation of mean pore diameter.
Note 4)
MPD ±15 Å means a ratio of pore having a diameter of (mean pore diameter) ±15 Å.

[Hydrotreating Reaction of Straight-Run Gas Oil]

Using catalysts A to C, a, b, and E to H prepared in the above Examples and Comparative Examples, a straight-run gas oil having the properties shown below was hydrotreated according to the following procedure.

First, the catalyst was packed into a high-pressure flow-through type reactor to form a fixed-bed catalyst layer. The catalyst was subjected to sulfidation as pretreatment under the following conditions.

Subsequently, a fluid mixture consisting of a feedstock oil and a hydrogen-containing gas heated to the reaction temperature was introduced through an upper part of the reactor to allow a hydrotreating reaction to proceed under the following conditions. A fluid mixture of a product oil and gases was discharged through a lower part of the reactor, and the product oil was separated in a gas/liquid separator.

Sulfidation of Catalyst: Each catalyst was subjected to liquid sulfidation with the feedstock oil.
  Pressure (hydrogen partial pressure): 4.9 MPa
  Atmosphere: Hydrogen and the feedstock oil (liquid hourly space velocity, 1.5 hr$^{-1}$; hydrogen/oil ratio, 200 m³ (normal)/kl)
  Temperature: Introduction of hydrogen and the feedstock oil at room temperature, about 22° C., heating at a rate of 20° C./hr, holding at 300° C. for 24 hr, and subsequent heating to the reaction temperature, i.e., 350° C., at a rate of 20° C./hr Hydrotreating Reaction Conditions:
  Reaction temperature: 350° C.
  Pressure (hydrogen partial pressure): 4.9 MPa
  Liquid hourly space velocity: 1.5 hr$^{-1}$
  Hydrogen/oil ratio: 200 m³ (normal)/kl Properties of Feedstock Oil:
  Kind of oil: straight-run gas oil from Middle East crude
  Density (15/4° C.): 0.8623
  Distillation characteristics: Initial distillation point of 186.0° C., 50% point of 316.0° C., 90% point of 355.5° C., end point of 371.5° C.
  Sulfur content: 1.74% by weight
  Nitrogen content: 210 ppm by weight
  Dynamic viscosity (@ 30° C.): 7.026 cSt
  Pour point: 0.0° C.
  Cloud point: 4.0° C.
  Cetane index: 55.4

The results of the reaction were analyzed by the following method.

The reactor was operated at 350° C., and 6 days thereafter, the product oil was sampled and analyzed for properties.

[1] Degree of Desulfurization (HDS) (%)

The proportion of sulfur content which has disappeared from the feedstock oil through conversion of sulfur content in the feedstock into hydrogen sulfide by desulfurization reaction is defined as the degree of desulfurization. The degree of desulfurization was calculated from the analytical values of sulfur content for the feedstock oil and product oil using the following equation. These results are as shown in Table 2.

[2] Desulfurization Reaction Rate Constant (Ks):

The rate constant of a reaction rate equation which gives the 1.3rd order of reaction with respect to decrease in sulfur content of the product oil (Sp) is taken as the desulfurization reaction rate constant (Ks).

Also, the higher the reaction rate constant, the more excellent the catalytic activity. These results are as shown in Table 2.

$$\text{Degree of desulfurization (\%)} = [(Sf-Sp)/Sf] \times 100$$

$$\text{Desulfurization reaction rate constant} = [1/0.3] \times [1/(Sp)^{0.3} - 1/(Sf)^{0.3}] \times (\text{LHSV})$$

wherein Sf: sulfur content in feedstock oil (% by weight)
Sp: sulfur content in product oil (% by weight)
LHSV: liquid hourly space velocity (hr$^{-1}$)

$$\text{Specific desulfurization activity (\%)} = ((\text{each desulfurization reaction rate constant})/(\text{desulfurization reaction rate constant of Catalyst a})) \times 100$$

[Table 2]

TABLE 2

| | Reaction temperature 350° C. | | | | |
|---|---|---|---|---|---|
| Catalyst | Sulfur content (ppm by weight) | Degree of desulfurization (%) | Rate constant | Specific activity (%) | Nitrogen content (ppm by weight) |
| A | 10 | 100 | 30.8 | 224 | <1 |
| B | 8 | 100 | 33.1 | 241 | <1 |
| C | 4 | 100 | 41.5 | 306 | <1 |
| a | 97 | 99.4 | 13.7 | 100 | 22 |
| b | 15 | 99.9 | 27.3 | 200 | <1 |
| E | 8 | 100 | 33.1 | 242 | <1 |
| F | 3 | 100 | 46.7 | 342 | <1 |
| G | 2 | 100 | 51.9 | 380 | <1 |
| H | 7 | 100 | 34.7 | 253 | <1 |

As is apparent from Table 2, ultra-deep desulfurization of a gas oil can be easily attained with Catalysts A to C and E to H produced by the process of the invention.

Moreover, as is apparent from the above results, the catalysts of the invention have extremely excellent activity for desulfurization and denitrification of a gas oil in ultra-deep desulfurization region at hydrogen partial pressure, reaction temperature, and the like which are the same as those in the case of conventional hydrotreatment of a gas oil.

[Hydrotreating Reaction of Straight-Run Kerosene]

Using catalysts A, B, C, a, and b prepared in the above Examples and Comparative Examples, a straight-run kerosene having the properties shown below was hydrotreated according to the following procedure.

First, the catalyst was packed into a high-pressure flow-through type reactor to form a fixed-bed catalyst layer. The catalyst was subjected to sulfidation as pretreatment under the following conditions.

Subsequently, a fluid mixture consisting of a feedstock oil and a hydrogen-containing gas heated to the reaction temperature was introduced through an upper part of the reactor to allow a hydrotreating reaction to proceed under the following conditions. A fluid mixture of a product oil and gases was discharged through a lower part of the reactor, and the product oil was separated in a gas/liquid separator.

Sulfidation of Catalyst: Each catalyst was subjected to liquid sulfidation with the straight-run gas oil.
  Pressure (hydrogen partial pressure): 4.9 MPa
  Atmosphere: Hydrogen and the feedstock oil (liquid hourly space velocity, 1.5 hr$^{-1}$; hydrogen/oil ratio, 200 m$^3$ (normal)/kl)
  Temperature: Introduction of hydrogen and the feedstock oil at room temperature, about 22° C., heating at a rate of 20° C./hr, holding at 300° C. for 24 hr, and subsequent heating to the reaction temperature, i.e., 350° C., at a rate of 20° C./hr Hydrotreating Reaction Conditions:
  Reaction temperature: 310° C.
  Pressure (hydrogen partial pressure): 3.5 MPa
  Liquid hourly space velocity: 3.0 hr$^{-1}$
  Hydrogen/oil ratio: 60 m$^3$ (normal)/kl Properties of Feedstock Oil:
  Kind of oil: straight-run kerosene from Middle East crude
  Density (15/4° C.): 0.7945
  Distillation characteristics: Initial distillation point of 141° C., 50% point of 199° C., 90% point of 255° C., end point of 280° C.
  Sulfur content: 0.25% by weight
  Nitrogen content: 5 ppm by weight
  Dynamic viscosity (@ 30° C.): 1.398 cSt The results of the reaction were analyzed by the following method.

The reactor was operated at 310° C., and 6 days thereafter, the product oil was sampled and analyzed for properties.

[1] Degree of Desulfurization (HDS) (%):

The proportion of sulfur content which has disappeared from the feedstock oil through conversion of sulfur content in the feedstock into hydrogen sulfide by desulfurization reaction is defined as the degree of desulfurization. The degree of desulfurization was calculated from the analytical values of sulfur content for the feedstock oil and product oil using the following equation. These results are as shown in Table 3.

[2] Desulfurization Reaction Rate Constant (Ks):

The rate constant of a reaction rate equation which gives the 1.3rd order of reaction with respect to decrease in sulfur content of the product oil (Sp) is taken as the desulfurization reaction rate constant (Ks).

Also, the higher the reaction rate constant, the more excellent the catalytic activity. These results are as shown in Table 3.

$$\text{Degree of desulfurization (\%)} = [(Sf-Sp)/Sf] \times 100$$

$$\text{Desulfurization reaction rate constant} = [1/0.3] \times [1/(Sp)^{0.3} - 1/(Sf)^{0.3}] \times (\text{LHSV})$$

wherein Sf: sulfur content in feedstock oil (% by weight)
Sp: sulfur content in product oil (% by weight)
LHSV: liquid hourly space velocity (hr$^{-1}$)

$$\text{Specific desulfurization activity (\%)} = ((\text{each desulfurization reaction rate constant})/(\text{desulfurization reaction rate constant of Catalyst a})) \times 100$$

[Table 3]

TABLE 3

| | Reaction temperature 310° C. | | | |
|---|---|---|---|---|
| Catalyst | Sulfur content (ppm by weight) | Degree of desulfurization (%) | Rate constant | Specific activity (%) |
| A | 9 | 99.6 | 4.2 | 140 |
| B | 8 | 99.7 | 4.4 | 147 |
| C | 6 | 99.8 | 4.9 | 160 |
| a | 22 | 99.1 | 3.0 | 100 |
| b | 14 | 99.4 | 3.6 | 120 |

As is apparent from Table 3, high-grade desulfurization can be easily attained also for a kerosene with catalysts of the invention.

Example 8

Alumina hydrate and orthophosphoric acid were kneaded each other, and the resulting mixture was extrusion-molded and then calcined at 600° C. for 2 hours to obtain a phosphorus oxide-alumina composite support in the form of cylindrical moldings having a diameter of 1/16 inch (phosphorus oxide/alumina weight ratio, 3/97; pore volume, 0.70 ml/g; specific surface area, 187 m²/g; mean pore diameter, 98 Å).

To 20.3 g of ion-exchanged water were added 9.3 g of cobalt nitrate hexahydrate, 4.6 g of citric acid monohydrate, and 12.0 g of ammonium molybdate, followed by heating to 80° C. and stirring for 10 minutes.

Into an eggplant type flask was introduced 30.0 g of the above phosphorus oxide-alumina composite support. The whole impregnating solution was added thereto with a pipette and the support was immersed in the solution at about 25° C. for 3 hours.

Thereafter, the support was allowed to dry in a nitrogen atmosphere and then dried in a muffle furnace at 120° C. for about 16 hours to obtain Catalyst D.

Comparative Example 3

In 20.3 g of ion-exchanged water were dissolved 3.8 g of cobalt carbonate, 13.4 g of molybdophosphoric acid, and 1.5 g of orthophosphoric acid. Thus, a solution for impregnation was prepared.

Into an eggplant type flask was introduced 30.0 g of a γ-alumina support (pore volume, 0.7 ml/g; specific surface area, 187 m²/g; mean pore diameter, 98 Å). The whole impregnating solution was added thereto with a pipette and the support was immersed in the solution at about 25° C. for 1 hour.

Thereafter, the support was allowed to dry in a nitrogen stream, subsequently dried in a muffle furnace at 120° C. for about 1 hour, and then calcined at 500° C. for 4 hours to obtain Catalyst c.

The chemical properties and physical properties of Catalysts D and c are shown in Table 4. The measuring methods for TEM and EPMA are as mentioned above.

[Table 4]

First, the catalyst was packed into a high-pressure flow-through type reactor to form a fixed-bed catalyst layer. The catalyst was subjected to sulfidation as pretreatment under the following conditions.

Subsequently, a fluid mixture consisting of a feedstock oil and a hydrogen-containing gas heated to the reaction temperature was introduced through an upper part of the reactor to allow a hydrotreating reaction to proceed under the following conditions. A fluid mixture of a product oil and gases was discharged through a lower part of the reactor, and the product oil was separated in a gas/liquid separator.

Sulfidation of Catalyst: Each catalyst was subjected to liquid sulfidation with the feedstock oil.
Pressure (hydrogen partial pressure): 4.9 MPa
Atmosphere: Hydrogen and the feedstock oil (liquid hourly space velocity, 0.66 hr$^{-1}$; hydrogen/oil ratio, 500 m³ (normal)/kl)
Temperature: Introduction of hydrogen and the feedstock oil at room temperature, about 22° C., heating at a rate of 25° C./hr, holding at 290° C. for 15 hr, and subsequent heating to the reaction temperature, i.e., 360° C., at a rate of 20° C./hr Hydrotreating Reaction Conditions:
Reaction temperature: 360° C.
Pressure (hydrogen partial pressure): 4.9 MPa
Liquid hourly space velocity: 0.66 hr$^{-1}$
Hydrogen/oil ratio: 500 m³ (normal)/kl Properties of Feedstock Oil:
Kind of oil: vacuum distillation gas oil from Middle East crude
Density (15/4° C.): 0.9185
Distillation characteristics: Initial distillation point of 349.0° C., 50% point of 449.0° C., 90% point of 529.0° C., end point of 556.0° C.
Sulfur content: 2.45% by weight
Nitrogen content: 650 ppm by weight
Dynamic viscosity (@ 30° C.): 7.026 cSt

TABLE 4

| | Chemical property | | | | | Physical property | | | | TEM | | EPMA | | | |
| | Amount of catalyst component | | | | $P_2O_5$/ | SA | PV | MPD | MPD ±15 Å | Average number of laminating layers | Average in-plane-direction length | | | | |
| Catalyst | CoO | $MoO_3$ | $P_2O_5$ | C | $MoO_3$ | [m²/g] | [ml/g] | [Å] | [%] | | (nm) | lave. | lmax. | lmin. | S |
| D | 5.5 | 22.5 | 0 | 3.3 | 0.13 | 132 | 0.45 | 132 | 80 | 3.2 | 3.0 | 18.3 | 24.0 | 13.8 | 2.2 |
| c | 5.4 | 22.3 | 2.9 | 3.4 | 0.13 | 134 | 0.44 | 133 | 79 | 2.8 | 2.7 | 17.3 | 50.0 | 6.4 | 8.5 |

Note 1)
Unit of the amount of each supported component is % by weight (on the basis of catalyst).
Note 2)
$P_2O_5$/$MoO_3$ is a value including $P_2O_5$ in the support.
Note 3)
SA is an abbreviation of specific surface area, PV is an abbreviation of pore volume, and MPD is an abbreviation of mean pore diameter.
Note 4)
MPD ±15 Å means a ratio of pore having a diameter of (mean pore diameter) ±15 Å.

[Hydrotreating Reaction of Vacuum Distillation Gas Oil]

Using catalysts D and c prepared in the above Example 8 and Comparative Example 3, a vacuum distillation gas oil having the properties shown below was hydrotreated according to the following procedure.

Pour point: 35° C. Asphaltene: <1000 ppm
Aniline point: 82° C.
The results of the reaction were analyzed by the following method.

The reactor was operated at 360° C., and 6 days thereafter, the product oil was sampled and analyzed for properties.

[1] Degree of Desulfurization (HDS) (%)

The proportion of sulfur content which have disappeared from the feedstock oil through conversion of sulfur content in the feedstock into hydrogen sulfide by desulfurization reaction is defined as the degree of desulfurization. The degree of desulfurization was calculated from the analytical values of sulfur content for the feedstock oil and product oil using the following equation. These results are as shown in Table 5.

[2] Desulfurization Reaction Rate Constant (Ks):

The rate constant of a reaction rate equation which gives the 1.5th order of reaction with respect to decrease in sulfur content of the product oil (Sp) is taken as the desulfurization reaction rate constant (Ks).

Also, the higher the reaction rate constant, the more excellent the catalytic activity. These results are as shown in Table 5.

Degree of desulfurization (%)=[(Sf−Sp)/Sf]×100

Desulfurization reaction rate constant=$2 \times [1/(Sp)^{0.5} - 1/(Sf)^{0.5}] \times (LHSV)$ wherein Sf: sulfur content in feedstock oil (% by weight)
Sp: sulfur content in product oil (% by weight)
LHSV: liquid hourly space velocity ($hr^{-1}$)

Specific desulfurization activity (%)=((each desulfurization reaction rate constant)/(desulfurization reaction rate constant of Catalyst c))×100

[Table 5]

TABLE 5

| | Reaction temperature 360° C. | | | |
|---|---|---|---|---|
| Catalyst | Sulfur content (ppm by weight) | Degree of desulfurization (%) | Rate constant | Specific activity (%) |
| D | 540 | 97.8 | 4.9 | 165 |
| c | 1240 | 94.9 | 3.0 | 100 |

As is apparent from Table 5, high-grade desulfurization can be easily attained also for a vacuum distillation gas oil with Catalyst D according to the production process of the invention.

As is apparent from the above results, the catalysts of the invention have extremely excellent activity for desulfurization and denitrification of a hydrocarbon oil at hydrogen partial pressure, reaction temperature, and the like which are the same as those in the case of conventional hydrotreatment of a hydrocarbon oil.

INDUSTRIAL APPLICABILITY

According to the present invention, there is provided a hydrotreating catalyst which can highly desulfurize sulfur compounds in a hydrocarbon oil and can simultaneously diminish nitrogen compounds without necessitating severe operating conditions and which can be produced in a simple and convenient manner. The hydrotreating catalyst has extremely excellent activity for desulfurization and denitrification of a hydrocarbon oil in ultra-deep desulfurization region at hydrogen partial pressure, reaction temperature, and the like which are the same as those in the case of conventional hydrotreatment of a hydrocarbon oil. Moreover, according to the invention, the above hydrotreating catalyst can be produced simply and conventionally. Furthermore, there is also provided a method for hydrotreating a hydrocarbon oil, which can diminish sulfur compounds and nitrogen compounds than before using the above hydrotreating catalyst without necessitating severe operating conditions.

The invention claimed is:

1. A catalyst for hydrotreating a hydrocarbon oil, which comprises an inorganic oxide support, wherein a phosphorous oxide is contained within the inorganic oxide support in an amount of 15% by weight or less and having provided thereon:
    at least one selected from metals in Group 6 of the periodic table in an amount of from 10 to 40% by weight,
    at least one selected from metals in Group 8 of the periodic table in an amount of from 1 to 15% by weight,
    each in terms of respective oxides on the basis of the catalyst, and
    carbon in an amount of from 2 to 14% by weight on the basis of the catalyst,
    wherein the catalyst has a specific surface area of from 100 to 400 m²/g, a pore volume of from 0.2 to 0.6 ml/g, and a mean pore diameter of from 50 to 200 Å.

2. The catalyst for hydrotreating a hydrocarbon oil according to claim 1, wherein a ratio by weight between the metal in Group 8 of the periodic table and the metal in Group 6 of the periodic table as a value of [metal in the Group 8]/[(metal in the Group 8)+(metal in the Group 6)] is from 0.1 to 0.25 in terms of respective oxides.

3. The catalyst for hydrotreating a hydrocarbon oil according to claim 1, wherein the element in Group 6 of the periodic table is molybdenum,
    the carbon is derived from an organic acid,
    the inorganic oxide support contains a phosphorus oxide in an amount of 0.1 to 13% by weight on the basis of the support,
    the inorganic oxide support has further provided thereon a phosphorus oxide in which the total amount of the phosphorus oxide is 15% by weight or less and,
    the ratio by weight [$P_2O_5/MoO_3$] of the total weight of the phosphorus oxide to molybdenum oxide is 0.05 to 1.0.

4. A process for producing the catalyst for hydrotreating a hydrocarbon oil according to any one of claims 1, 2, and 3, which comprises supporting a metal in Group 6 of the periodic table so as to be at from 10 to 40% by weight, a metal in Group 8 of the periodic table so as to be at from 1 to 15% by weight in terms of respective oxides, and carbon so as to be at from 2 to 14% by weight on the basis of the catalyst, using a solution containing a compound containing at least one selected from metals in Group 8 of the periodic table, a compound containing at least one selected from metals in Group 6 of the periodic table, and an organic acid, on an inorganic oxide support containing a phosphorus oxide at 15% by weight or less on the basis of the support which has a specific surface area of from 230 to 500 m²/g, a pore volume of from 0.5 to 1 ml/g, and an mean pore diameter of from 40 to 180 Å, followed by drying at 200° C. or lower.

5. The process for producing the catalyst for hydrotreating a hydrocarbon oil according to claim 4, wherein the inorganic oxide support containing a phosphorus oxide is prepared by a kneading method of kneading a starting material of the inorganic oxide support and a starting material of the phosphorus oxide.

6. The process for producing the catalyst for hydrotreating a hydrocarbon oil according to claim 4, wherein the inorganic oxide support containing a phosphorus oxide is prepared by calcining at from 400° C. to 700° C. for from 0.5 to 10 hours.

7. The process for producing the catalyst for hydrotreating a hydrocarbon oil according to claim 4, wherein the element in Group 6 of the period table is molybdenum, the carbon is derived from an organic acid, the inorganic oxide support contains a phosphorus oxide in an amount of 0.1 to 13% by weight on the basis of the support, the inorganic oxide support has further provided thereon a phosphorus oxide in which the total amount of the phosphorus oxide is 15% by weight or less and, the ratio by weight [$P_2O_5/MoO_3$] of the total weight of the phosphorus oxide to molybdenum oxide is 0.05 to 1.0.

8. The process for producing the catalyst for hydrotreating a hydrocarbon oil according to claim 7, wherein the inorganic oxide support contains a phosphorus oxide in an amount of 1 to 13% by weight on the basis of the support.

9. The process for producing the catalyst for hydrotreating a hydrocarbon oil according to claim 8, wherein the inorganic oxide support contains a phosphorus oxide in an amount of 1 to 10% by weight on the basis of the support.

10. The process for producing the catalyst for hydrotreating a hydrocarbon oil according to claim 7, wherein the inorganic oxide support containing a phosphorus oxide is prepared by a kneading method of kneading a starting material of the inorganic oxide support and a starting material of the phosphorus oxide.

11. The process for producing the catalyst for hydrotreating a hydrocarbon oil according to claim 7, wherein the inorganic oxide support containing a phosphorus oxide is prepared by calcining at from 400° C. to 700° C. for from 0.5 to 10 hours.

12. A method for hydrotreating a hydrocarbon oil, wherein a catalytic reaction is carried out at a hydrogen partial pressure of from 0.7 to 8 MPa, a temperature of from 220 to 420° C., a liquid hourly space velocity of from 0.3 to 10 $hr^{-1}$ in the presence of the catalyst for hydrotreating a hydrocarbon oil according to any one of claims 1, 2 and 3.

13. The catalyst for hydrotreating a hydrocarbon oil according to claim 3, wherein the inorganic oxide support contains a phosphorus oxide in an amount of 1 to 13% by weight on the basis of the support.

14. The catalyst for hydrotreating a hydrocarbon oil according to claim 13, wherein the inorganic oxide support contains a phosphorus oxide in an amount of 1 to 10% by weight on the basis of the support.

15. The catalyst for hydrotreating a hydrocarbon oil according to claim 3, wherein a ratio by weight between the metal in Group 8 of the periodic table and molybdenum as a value of [metal in the Group 8]/[(metal in the Group 8)+ (molybdenum)] is from 0.1 to 0.25 in terms of respective oxides.

* * * * *